Figure 1:
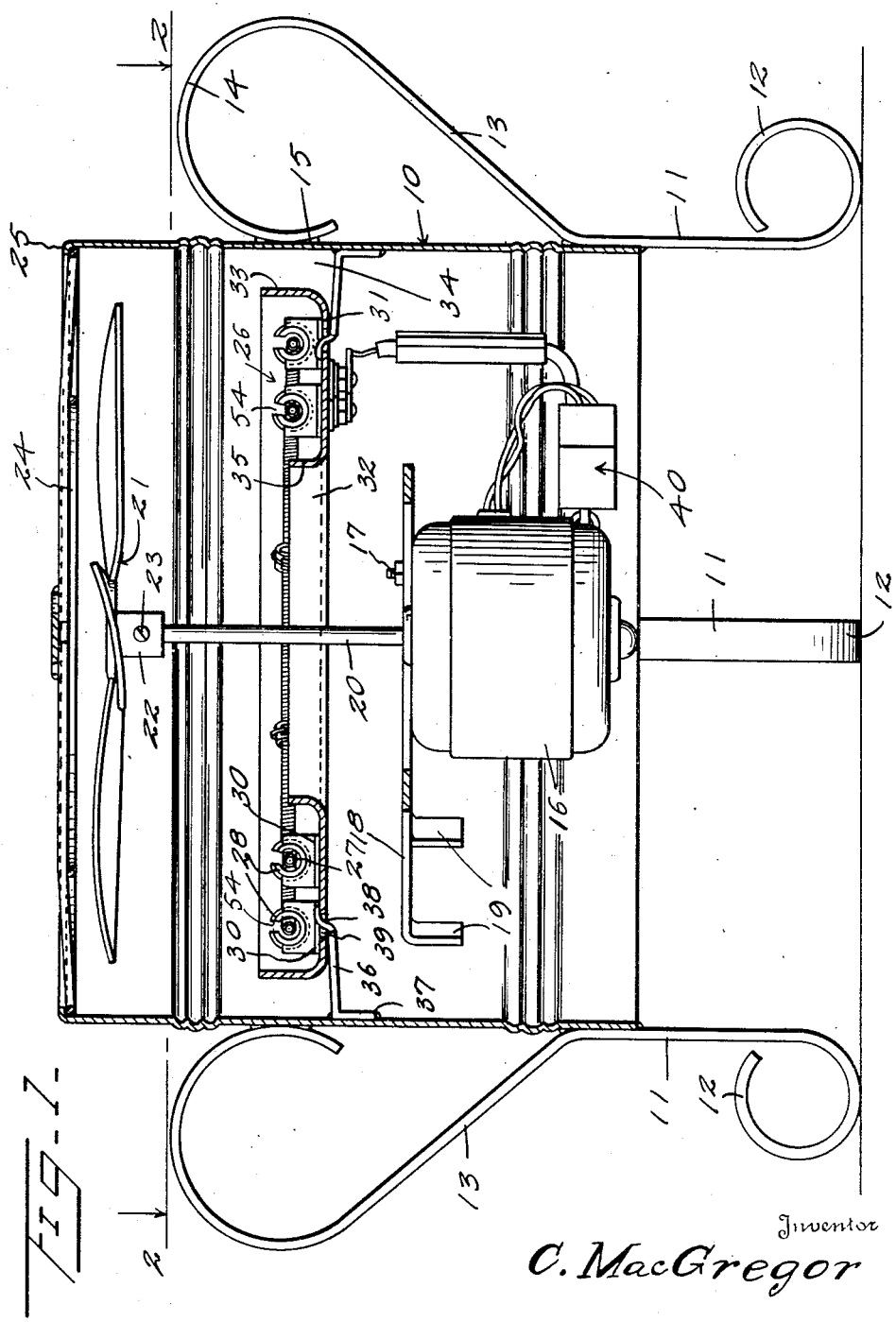

Sept. 18, 1945.   C. MacGREGOR   2,385,295
ELECTRIC HEATER AND CIRCULATOR
Filed March 23, 1943   2 Sheets-Sheet 1

Inventor
C. MacGregor
By Kimmel & Crowell
Attorneys

Sept. 18, 1945.　　　C. MacGREGOR　　　2,385,295
ELECTRIC HEATER AND CIRCULATOR
Filed March 23, 1943　　　2 Sheets-Sheet 2
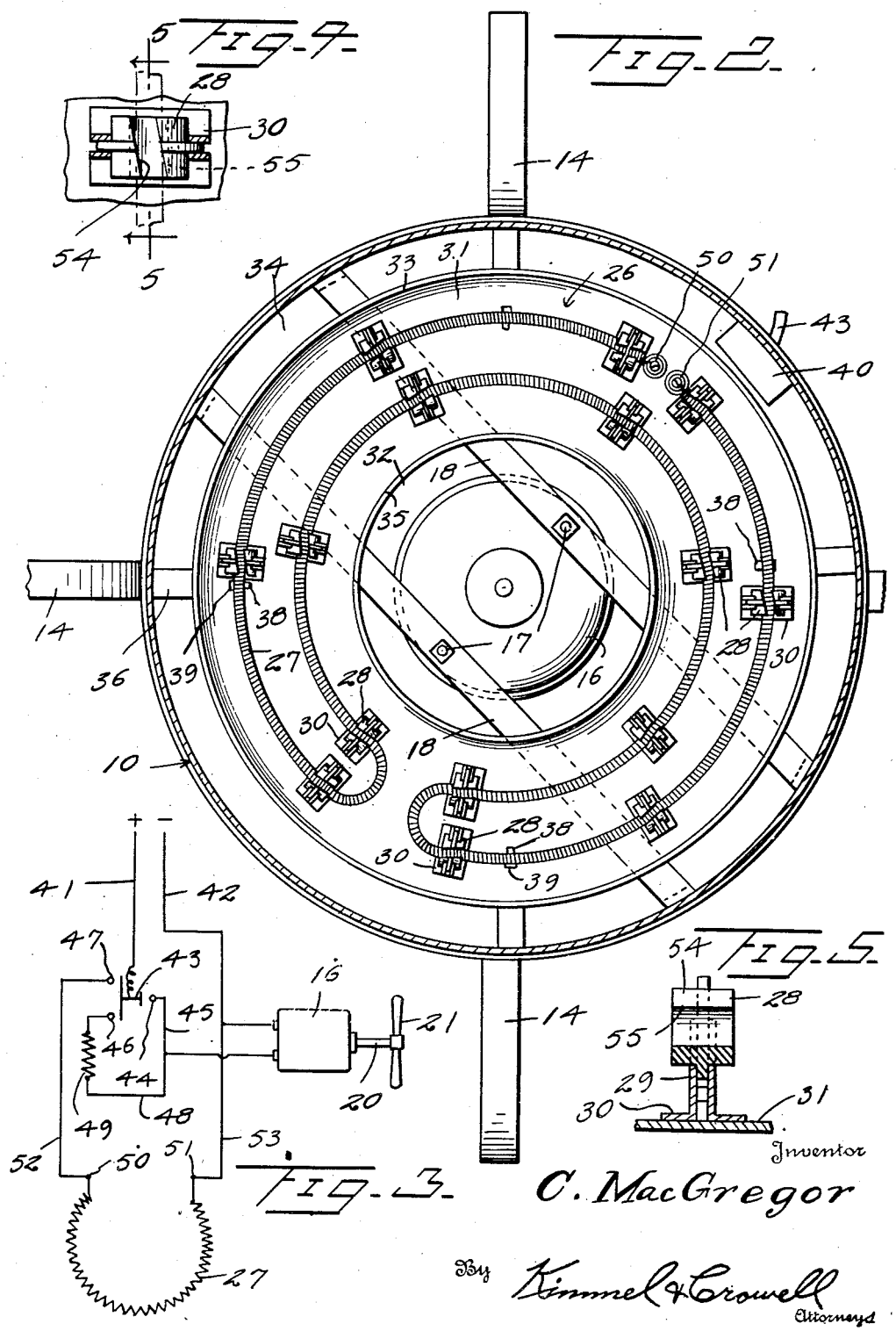
Inventor
C. MacGregor
By Kimmel & Crowell
Attorneys Patented Sept. 18, 1945

2,385,295

UNITED STATES PATENT OFFICE 2,385,295

ELECTRIC HEATER AND CIRCULATOR

Clide MacGregor, Flint, Mich.

Application March 23, 1943, Serial No. 480,204

4 Claims. (Cl. 219—39)

This invention relates to electric heaters and circulators.

An object of this invention is to provide a combined heater and circulator which may optionally be used as either an air circulator or a combined heater and circulator.

Another object of this invention is to provide a device of this kind which can be mounted in either a vertical position for forcing the air vertically or may be mounted in a horizontal position.

A further object of this invention is to provide a device of this kind which includes a supporting housing open at each end, a motor supported in the housing adjacent one end thereof, fan blades secured to the armature shaft, and a heating means interposed between the motor and the fan blades.

A further object of this invention is to provide in combination with a fan motor and fan blades, a heating unit so constructed and arranged that the unheated air will initially pass the fan motor to thereby cool the latter and then will pass the heater and be heated thereby, the heater including a heating coil and a shield about the coil so positioned that the moving air will not strike the coil and thereby lower the efficiency of the latter.

A further object of this invention is to provide a device of this kind which is simple in construction and is capable of producing a greater volume of heated air than devices of higher rated capacities.

A further object of this invention is to provide a device of this kind which is so constructed and arranged that when used as a circulating heater the fan will operate at a lower speed so as to permit the air passing the heater to heat to a higher degree.

This invention consists of the novel construction, combination and arrangement of parts as will be hereinafter referred to and illustrated in the accompanying drawings wherein is shown an embodiment of the invention, but it is to be understood that changes, modifications and variations may be resorted to which fall within the scope of the invention as claimed.

In the drawings:

Figure 1 is a vertical section of a combined heater and circulator constructed according to an embodiment of this invention, Figure 2 is a sectional view taken on the line 2—2 of Figure 1, Figure 3 is a diagrammatic view of the electric circuits embodied in this invention, Figure 4 is a plan view of one of the insulated supports for the heating coil, and Figure 5 is a sectional view taken on the line 5—5 of Figure 4.

Referring to the drawings, the numeral 10 designates generally a housing of tubular construction which is open at each end thereof, the housing 10 in the present instance being of cylindrical configuration. The housing 10 is adapted to be supported upwardly from a plane surface by means of a plurality of legs 11 which are spot welded or otherwise fixedly secured at their upper ends to the outer side of the housing 10. The legs 11 are formed with ring-shaped feet 12, being formed from a flat strip of metal which is bent in a loop at the lower end. The legs 11 at their upper ends are continued upwardly and outwardly as at 13 and then bent in an upper loop 14 which is spot welded or otherwise fixedly secured as at 15 to the outer side of the housing 10. The loops 14 may constitute handles when the housing 10 is in a vertical or upright position and the loops or handles 14 are adapted to coact with the feet 12 in supporting the housing 10 in a substantially horizontal position when the housing is laid on its side.

A motor 16 is mounted in the lower portion of the housing 10, being secured by bolts 17 to a pair of parallel supporting bars 18. The supporting bars 18 extend across the interior of the housing 10 and are formed with right angular downwardly extending opposite end portions 19 which are adapted to be spot welded or otherwise fixedly secured to the inner side of the housing 10. The motor 16 is formed with an elongated armature shaft 20 which extends in the direction of the outlet end of the housing 10, and a fan blade structure 21 which is formed with a hub 22 is secured by fastening means 23 to the upper or outer end of the shaft 20.

A grill or guard member 24 engages over the outer or upper end of the housing 10 and is held therein by overturning the outer end of the housing 10 as indicated at 25. A heating unit generally designated as 26 is disposed in the housing 10 between the fan blade structure 21 and the motor 16. The heating unit 26 is spaced from the motor 16 and also the fan blade structure 21.

This unit comprises a resistance or heating coil 27 which is supported in a plurality of tubular insulators 28. The insulators 28 are mounted in supporting members 29 formed with oppositely extending feet 30 which are secured to a heat reflecting shield 31. The shield 31 is of annular construction being formed with an opening 32 in the center thereof and the shield 31 is also formed with an outer cylindrical flange 33. The diameter of the flange 33 is substantially less than the inner diameter of the housing 10, thereby providing an air space 34 between the flange 33 and the housing 10. The shield 31 is also formed with an inner cylindrical flange 35 which is substantially shorter than the outer flange 33. The shield 31 is supported from the housing 10 by means of a plurality of supporting arms 36. The arms 36 extend radially inwardly from the housing 10, being formed at their outer ends with substantially right angular base portions 37 which are adapted to be welded or otherwise fixedly secured to the inner side of the housing 10.

The inner ends of the arms 36 are formed with a tongue or clip 38 which is adapted to be extended through an opening 39 provided in the shield 31. The tongues 38 are then bent downwardly against the outer side of the shield 31, as shown in Figure 1, so as to thereby tightly hold the shield 31 on the supporting arms 36.

A switch member 40 is secured to the inner side of the housing 10 and is adapted to be connected to a source of electric current supply by means of a pair of conductors 41 and 42. The conductor 42 is connected directly to the motor 16, whereas the conductor 41 is connected to the movable circuit breaking and closing member 43 forming part of the switch 40. The switch 40 includes a contact 44 which is connected by means of a conductor 45 to the motor 16, and the switch 40 also includes a pair of terminals 46 and 47. The terminal 46 is connected by means of a conductor 48 to the conductor 45, and preferably a speed reducing resistance 49 is interposed in the conductor 48 so that when the switch arm 43 is in contact with the contact member 46, the motor 16 will operate at a reduced speed.

The coil 27 is connected to a pair of terminals 50 and 51 and the terminal 50 is connected by means of a conductor 52 to the contact 47. The terminal 51 is connected by means of a conductor 53 to the conductor 42. The switch 40 is of conventional construction being so constructed and arranged that when the switch arm 43 is in engagement with the contact 44 the motor 16 will operate without heating up of the coil 27. When the switch arm 43 is in engagement with the two contacts 46 and 47 the motor 16 will operate at a reduced speed by reason of the resistance 49 and at the same time the electric circuit will be completed from the switch arm 43 and the contact 47 to the conductor 52, the coil 27 and the conductor 53. The provision of the shield 31 which is of annular construction and interposed between the motor 16 and the fan blades 21 provides a means whereby the draft of air generated by the fan blades 21 will not directly strike the heating coil 27.

In this manner the moving air will not tend to cool the coil 27 so that the heating unit will be radiant in characteristic although combining the principle of radiant and convective heat transfer and will, therefore, permit the use of a coil having a reduced resistance over coils at present in use for similar purposes due to the fact that air does not impinge on the heating unit.

The insulators 28 in the present instance are formed in their upper sides with an opening 54 which is inclined to the longitudinal axis of the insulator so that the coil 27 may be inserted into the insulator 28 through the opening 54 and when the coil 27 engages in the axial opening 55 formed in the insulator 28 the coil will be locked in the insulator. This type of insulator provides an improved means whereby the coil may be inserted in the insulators without threading the coil through the openings of the insulators, being inserted by slightly bending the coil to the angle of the opening 54 and then pushing the coil downwardly into the opening or bore 55.

In the use and operation of this heater and circulator when it is desired to only use the device as a circulator or cooler, the switch arm 43 is moved to engage the contact 44. The heating coil 27 will not be in circuit with the motor 16 so that the air passing the motor 16 and the heating unit 26 will not be heated. The air will be drawn from the bottom of the housing 10 and forced out through the grill 24 in the top of the housing.

When it is desired to use the device as a combined heater and circulator the switch arm 43 is moved into engagement with the two contacts 46 and 47. At this time the motor 16 will operate at a speed reduced from the normal speed and at the same time the heating coil 27 will be energized. The draft of air drawn through the housing 10 by the fan blades 21 will initially pass about the motor 16 thereby tending to keep the motor 16 cool, and when the air passes the shield 31, passing through the center opening 32 and in the space 34, this air will be heated and will then be forced out of the housing 10 by the fan blades 21.

It will be understood that if desired the inner surface of the shield 31 together with the inner surfaces of the flanges 33 and 35 may be formed with reflecting surfaces so as to thereby reflect or radiate the heat outwardly in the direction of the blades 21 and in the direction of the movement of the air passing through the housing 10.

What I claim is:

1. A circulating heater and cooler comprising a tubular housing open at each end, a fan motor, means supporting said motor adjacent one end of said housing, said motor having an elongated armature shaft extending from one end of said motor, fan blades secured to said shaft adjacent the opposite end of said housing, an annular heating element in said housing interposed between and spaced from said fan blades and said motor, said heating element including a heating coil, a ring, shaped radiant metallic shield, and means mounting said coil on said shield on the side of the latter confronting said fan blades and in spaced relation to said shield whereby the heat generated by said coil will be reflected in the direction of said blades.

2. A circulating heater and cooler comprising a tubular housing open at each end, a fan motor, means supporting said motor adjacent one end of said housing, said motor having an elongated armature shaft extending from one end of said motor, fan blades secured to said shaft adjacent the opposite end of said housing, an annular heating element in said housing interposed between and spaced from said fan blades and said motor, said heating element including a heating coil, a ring-shaped radiant metallic shield, and means mounting said coil on said shield spaced from the side of the latter confronting said fan blades, said shield including inner and outer flanges extending in the direction of said blades, said outer flange having a diameter less than the inner diameter of said housing whereby air may pass between said outer flange and said housing the blades of said fan being arranged to pull air past said shield.

3. A circulating heater and cooler comprising a housing open at each end, supporting legs fixed to said housing, a motor in said housing, means supporting said motor axially of said housing and at the lower portion thereof, an elongated armature shaft carried by said motor, a fan secured to the upper end of said shaft, a ring-shaped heating element, a plurality of inwardly extending supporting arms fixed at their outer ends to said housing, said element including a flanged heat radiating shield having a plurality of openings, and securing tongues carried by the inner ends of said arms engaging through said openings and bent right angularly against the upper side of said shield for fixedly holding said shield on said arms.

4. A device providing optionally a room air cooler and circulator or a room air circulator and heater, comprising in combination a structure including an open ended casing, supporting legs for the casing, a fan motor centrally mounted near one end of the casing and spacedly supported by means extended from the interior of the casing, a shielded heating unit positioned in front of said motor and spacedly supported from the sides of the casing by spaced supports, and a fan mounted on a shaft extended from said motor, said fan being positioned near the other end of said casing, said heating unit including a ring-shaped heat radiating shield and a heating element, the heating element being mounted within said shield and carried thereby, the said structure providing for the air to be drawn into said casing around all sides of said motor to keep the motor cool, then past the motor around the inner and outer sides of said shield to be thereby heated by the heat emanating from the heating element without directly striking the heating element and whereby the efficiency of the heating element is not lowered as would be the case if directly in the air flow, the heated air then thrown out of the other end of the casing by the fan, means being provided for adjusting the fan on the shaft to its point of maximum efficiency.

CLIDE MacGREGOR.